United States Patent [19]

Dutchburn

[11] Patent Number: 4,791,701
[45] Date of Patent: Dec. 20, 1988

[54] UTILITY TOOL FOR ROTISSERIE SPITS

[76] Inventor: Leslie G. Dutchburn, 7 De Vere Gardens, Toronto, Ontario, Canada, M5M 3E4

[21] Appl. No.: 87,766

[22] Filed: Aug. 21, 1987

[51] Int. Cl.[4] .............................................. B25G 3/20
[52] U.S. Cl. ..................... 16/111 R; 7/110; 7/167; 16/114 R; 16/116 R; 16/DIG. 24; 294/10
[58] Field of Search ............. 16/114 R, 111 R, 116 R, 16/DIG. 24, DIG. 12, DIG. 40, DIG. 41; 7/109, 110, 167, 170, 169; 294/9, 10, 14, 12, 27.1; 99/419, 421 A

[56] References Cited

U.S. PATENT DOCUMENTS

| | | | |
|---|---|---|---|
| 1,134,905 | 4/1915 | Prochaska | 294/27.1 |
| 1,453,979 | 5/1923 | Holsen | 7/109 X |
| 2,876,694 | 3/1959 | Thomas | 99/421 A |
| 4,034,595 | 7/1977 | Smith | 7/169 X |
| 4,471,985 | 9/1984 | Mahoney | 294/27.1 X |

FOREIGN PATENT DOCUMENTS 2230319  12/1974  France .................... 99/419

Primary Examiner—Nicholas P. Godici
Assistant Examiner—J. Reed Batten, Jr.
Attorney, Agent, or Firm—David W. Wong

[57] ABSTRACT

The utility tool facilitates the handling of rotisserie spits particularly heated spits during cooking. The tool can be used to carry a spit crosswise or lengthwise. A stepped slot is formed in a projected plate mounted at one end of the tool for engaging the spit crosswise for lifting the latter from a cooking appliance. Another slot is formed in a second projected plate mounted at the second end of the tool to facilitate adjustment of meat forks used on rotisserie spits. An arcuate notch is formed in one of the projected plate to facilitate cleaning of the cooking grill as well as placement of the meat forks into the meat being cooked.

14 Claims, 2 Drawing Sheets

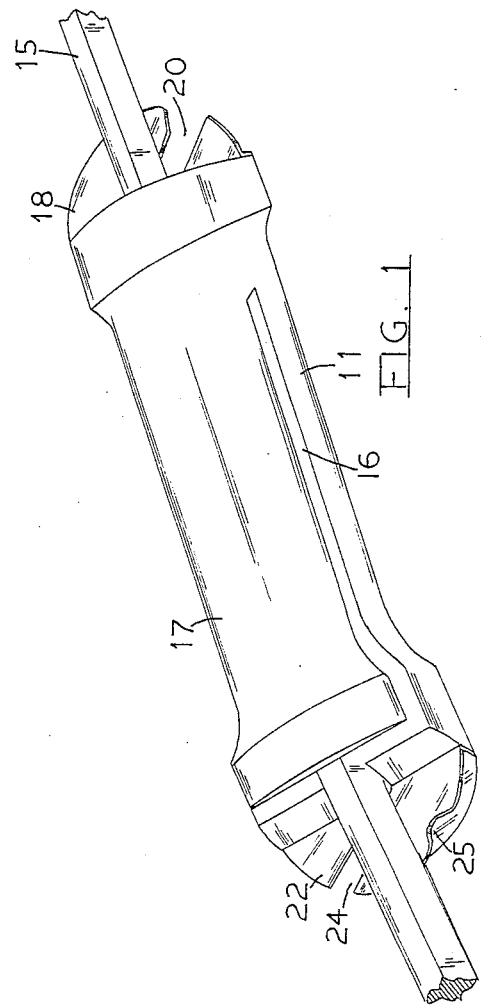
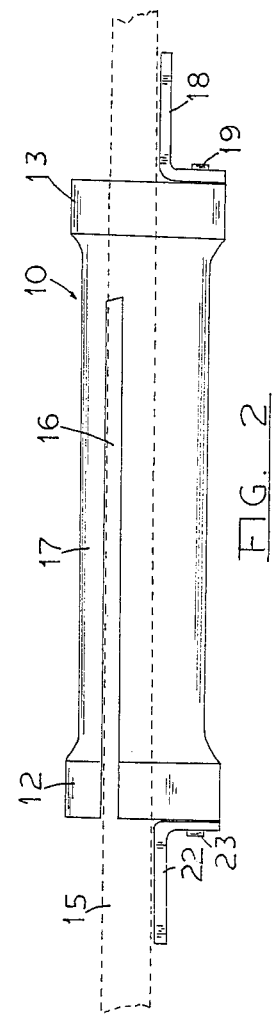

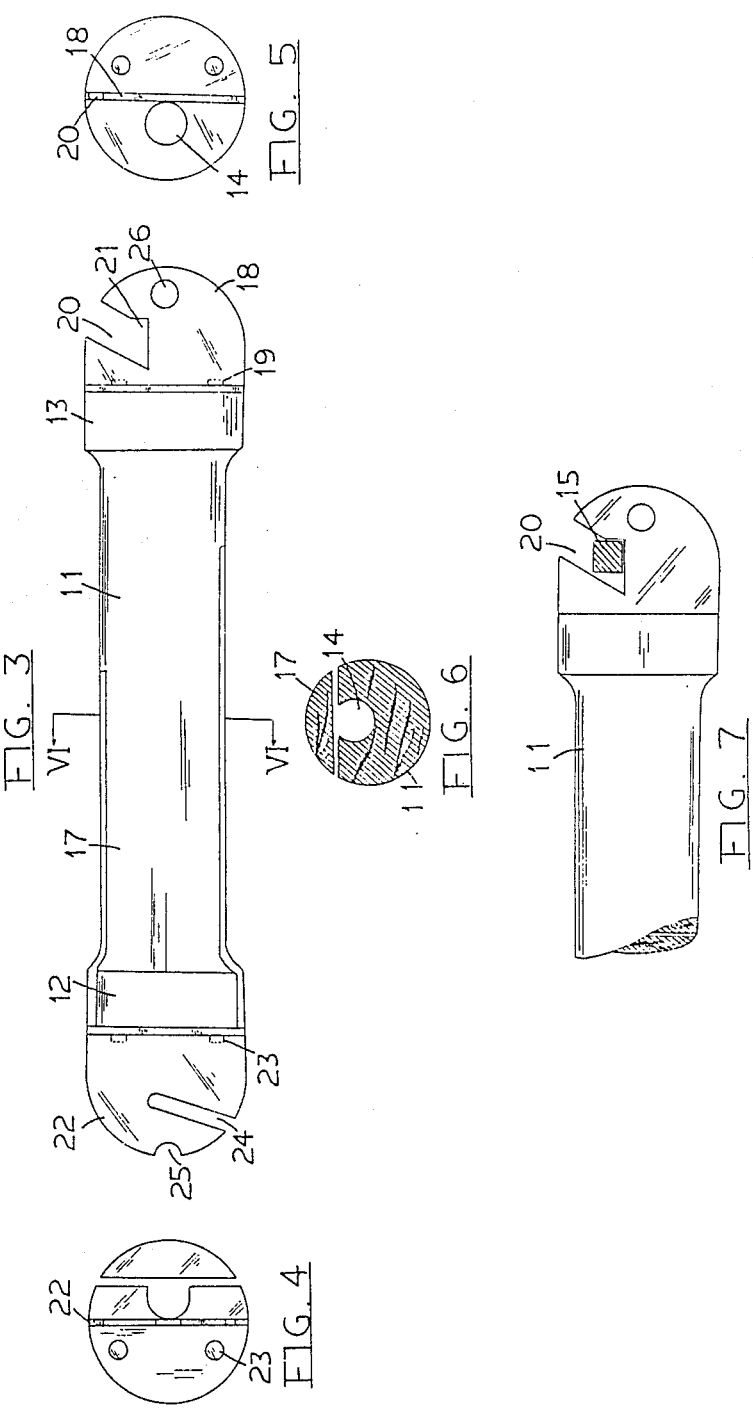

UTILITY TOOL FOR ROTISSERIE SPITS

BACKGROUND OF THE INVENTION

This invention relates to hand tools and particularly to a utility hand tool operative for handling rotisserie spits.

In using a rotisserie for cooking, frequently it is necessary to remove the rotisserie spit from the cooking appliance for various reasons such as to marinate the meat, or to re-adjust the mounting position of the meat, or to remove the cooked meat for consumption at the end of cooking. Since the rotisserie is located in a very confined space of the appliance such as an oven cavity or a barbeque unit, it is usually very difficult to remove it without subjecting the hands of the user to the potential danger of being burned. Such potential danger is aggravated by the somewhat heavy weight of both the spit together with the meat mounted thereon so that it is difficult to remove the spit with only one hand. Commonly, oven mitts are employed for removing the rotisserie spit during cooking; however, due to the high temperature involved in cooking, the oven mitts often become burned and offer little protection to the hands. Also, oven mitts are bulky amd would obstruct the view of the spit located in the confined area of the appliance.

SUMMARY OF THE INVENTION

It is a principal object of the present invention to provide a utility tool which can be used to provide easy and safe handling of a rotisserie spit.

It is another object of the present invention to provide a utility tool which enhances various useful operations of the rotisserie spit.

It is yet another object of the present invention to provide a utility tool operative to obviate the potential of being burned in the handling of a heated rotisserie spit.

It is still another object of the present invention to provide a utility tool operative for adjusting the meat forks on a rotisserie spit.

It is another object of the present invention to provide a utility tool having a provision for cleaning the cooking grill of a cooking appliance.

BRIEF DESCRIPTION OF THE DRAWINGS

These and other objects of this invention together with its advantages will be more apparent from the following description and drawings which illustrate a specific embodiment by way of example and in which:

FIG. 1 is a front perspective elevation view showing the use of the utility tool according to the present invention as a gripping handle for carrying or handling a rotisserie spit.

FIG. 2 is a side elevation perspective view thereof.

FIG. 3 is a top elevation perspective view thereof.

FIG. 4 is an end elevation perspective view thereof.

FIG. 5 is an end elevation perspective view opposite to that of FIG. 4.

FIG. 6 is a cross section view along line VI—VI in FIG. 3.

FIG. 7 is side elevation perspective view showing the use of the utility tool according to the present invention for engaging crosswise with a rotisserie spit for carrying or lifting the latter out of a cooking appliance.

DESCRIPTION OF A SPECIFIC EMBODIMENT

Referring now to the drawings in which like reference numerals designate corresponding parts in the several views, the utility tool 10 according to the present invention has a handle-like body 11 having a length of approximately 4½ inches long which can fit comfortably in the grip of a hand. The body 11 may be made of a material having a low heat conductivity such as wood or plastics. It has a generally cylindrical shape; however, it can be appreciated that it may have a square or polygonal cross sectional shape. Two slightly larger diameter enlarged end portions 12 and 13 are formed on the body. The advantages of such larger end portions will become apparent in the following description. A through bore 14 which may be circular in cross section, extends from one end of the body 11 to the other end. The circular bore 14 is parallel to the longitudinal axis of the body 11; however, its longitudinal axis is offset from the longitudinal axis of the body 11 and preferably its side is tangential to the latter. The bore 14 has a diameter of approximately half of an inch so that a common rotisserie spit 15 may be inserted through the bore 14. A slot 16 extends from one end of the body 11 to approximately two inches from the other end thus forming a cantilever portion 17 over the base portion of the body 11. The inner surface of the cantilever portion 17 is tangential to the bore 14. When the rotisserie spit 15 is inserted into bore 14 of the body 11, gripping the body 11 simply by hand will exert a pressure on the cantilever portion 17 to press the inner surface of the cantilever portion onto the spit 15 so as to grasp the spit 15 tightly. The lateral side edges of the cantilever portion 17 are slightly recessed from the circumference of the body 11 so as to avoid the slot 16 from pinching the hand gripping the body 11 when the cantilever portion 17 is being pressed down.

As shown in FIG. 1 the tool according to the present invention may be used to grip a rotisserie spit positioned transverse to the hand or alternatively along the same line as the hand. This can be achieved by just grasping the underside of the body 11 with the hand and exerting pressure with the thumb on the enlarged end portion of the cantilever portion 17. In this manner, the tool 10 may be used almost like an additional handle to the handle normally provided at one end of the spit.

An L-shaped metal plate member 18 is provided at one end of the body 11. The metal plate member 18 may be secured to the end of the body 11 by screws 19. The edge of the steel plate member is preferably rounded in shape so that there are no sharp corners or edges to cause accidental cutting of the user's hand or fingers as well as to present a more pleasing asthetic appearance.

An oblique slot 20 approximately 5/16 inch wide is formed in the metal plate member 18 in a location adjacent to the end of the body 11. Preferably the slot 20 is formed at approximately 30 degrees relative to the end surface of the body 11. The slot 20 has an offset stepped portion 21 having non-parallel sides and with one side therein substantially parallel to the end surface of the body 11. The slot 20 is operative to engage a rotisserie spit transversely as best shown in FIG. 7 by first tilting the tool to receive the spit at the entrance of the slot 20 and then tilting the tool again to position the spit into the stepped portion 21. Thus, the offset stepped portion 21 prevents the spit from sliding out of the slot 20 accidentally. With the provision of the slot 20, the utility tool may be used to enhance the removal of a heated rotisserie spit from the confined cooking area of an appliance. In such operation, the user would grip the tool transverse to the hand and then extend the tool 10 into the cooking area of the appliance with the steel plate member 18 facing the rotisserie spit. The tool 10 is then tilted to engage the slot 20 transverse in the stepped portion 21. The spit can then be safely lifted out of the appliance with the tool. When extending the hand into the appliance, the ends of the tool serve as a spacers to keep the hand away from the hot surfaces in the appliance as well as the meat being cooked thus preventing the hand from being burned accidentally.

A second L-shaped metal plate member 22 is provided at the other end of the body 11 and is secured in place such as by screws 23. The second L-shaped metal plate member 22 may also have a rounded shape similar to the first L-shaped metal plate member 18. An oblique wrench slot 24 approximately ⅛ inch wide is formed in the plate member 22 as shown in FIG. 3. The wrench slot 24 is operative for loosening or securing the wing-type set screws used for securing the sleeves carrying the meat forks on the spit. These set screws are particularly difficult to undo or tighten when they are hot and with cooking fluid and grease accumulated theron during cooking. The wrench slot 24 is preferably formed in a position extending at about 15 degrees from he end surface of the body 11. With such an angled position the tool can be operated to loosen the set screws from the meat forks without the potential danger of the hand coming into contact with the heated meat being cooked as well as spaced from the heated spit.

A small arcuate notch 25 is also formed at the outer edge of the metal plate member 22. The arcuate notch 25 is operative for cleaning the metal grill in the cooking appliance, or for pushing the meat forks into the heated meat during cooking. Typically the arcuate notch 25 may be ¼ inch in width which is the dimension suitable for cleaning commonly available grills.

An opening 26 may also be formed in either one of the L-shaped metal plate member 22 or 18 to facilitate hanging of the tool in storage.

Due to the offset position of the bore 14 from the longitudinal axis of the body 11, the weight of the tool 10 in unevenly distributed on two sides with respect to the longitudinal axis of the body 11. Thus, the tool 10 would inherently rest with the heavy side at the bottom on a table surface without rolling. Such anti-rolling feature is particularly advantageous in working with the tool when it is necessary to place it on a small working surface.

Also, the stepped portion 21 of the oblique slot 20 forms a hook which can be utilized to pull a heated meat fork out of the meat being cooked. Usually, the meat fork is firmly imbedded in the hot meat in cooking.

Furthermore, it can be appreciated that the tool can be operated equally efficiently by either a left-handed or right-handed user.

While the invention has been particularly shown and described with reference to a preferred embodiment thereof, it will be understood by those skilled in the art that various changes in form and detail may be made therein without departing from the spirit and scope of the invention.

I claim:

1. A utility tool comprising
an elongated body member,
a transverse slot formed in said body member and extending from one end to a short distance from the other end of said body member said transverse slot separating said body member into a cantilever portion and a base portion,
a through bore formed in said base portion and extending offset from and parallel to the longitudinal axis of said body member, and said bore being in communication with said slot over the entire length of said slot,
said cantilever portion having a flat inner surface tangential to said through bore.

2. A utility tool according to claim 1 wherein said body member is substantially cylindrical in shape, and said cantilever portion having lateral edges recessed from the circumference of said cylindrical body member.

3. A utility tool according to claim 2 including an L-shaped metal plate member mounted to one end of said cylindrical body member, said metal plate member having a projected portion extending substantially perpendicular to said one end of said body member, a slot formed in said projected portion and operative to engage crosswise with a rotisserie spit, said slot having a stepped edge portion, said stepped edge portion having non-parallel sides and operative to receive said rotisserie spit to rest therein without accidentally sliding out of said slot.

4. A utility tool according to claim 3 wherein said projected portion of said metal plate member is arcuate in shape, and said slot being formed adjacent to said one end of said body member.

5. A utility tool according to claim 4 wherein said slot extends substantially about 30 degrees from the surface of said one end of said body member.

6. A utility tool according to claim 5 including a second L-shaped metal plate member mounted to the other end of said body member, said second L-shaped metal plate member having a projected portion extending substantially perpendicular to said other end of said body member, a slot formed in said projected portion of said second L-shaped metal plate member, said slot extending adjacent to said other end of said body member.

7. A utility tool according to claim 6 wherein said projected portion of said second L-shaped metal plate member is arcuate in shape and said slot is about ⅛ inch in width.

8. A utility tool according to claim 7 including an arcuate notch formed along the edge of said projected portion of one of the L-shaped metal plate members.

9. A utility tool according to claim 8 including an opening formed in the projected portion of one of the L-shaped metal plate members.

10. A utility tool according to claim 9 wherein the end portion of said one end and said other end have a larger diameter than the middle portion of said body member.

11. A utility tool according claim 10 wherein said slot in said projected portion of said second L-shaped metal plate member extends at about 15 degrees relative to the surface of said other end of said body member.

12. A utility tool according to claim 11 wherein said arcuate notch is about ¼ inch in width.

13. A utility tool according to claim 12 wherein said body member is made of a material having a low conductivity of heat.

14. A utility tool according to claim 13 wherein said body member is made of wood.

* * * * *